Jan. 4, 1944.    J. B. HAYS ET AL    2,338,245
FAULT-LOCATING DEVICE
Filed Sept. 14, 1942
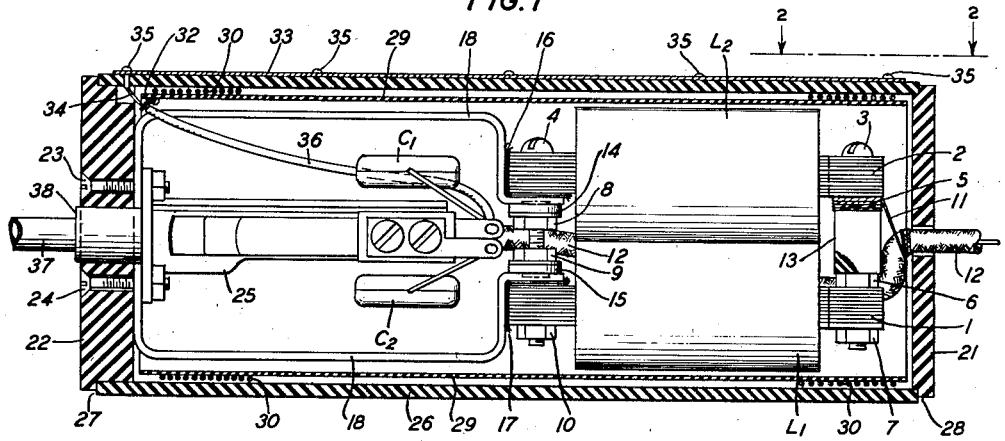
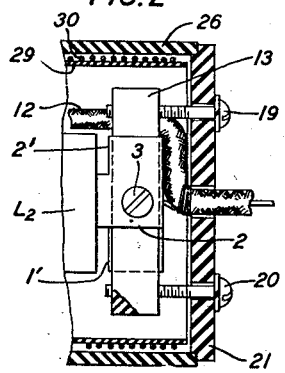
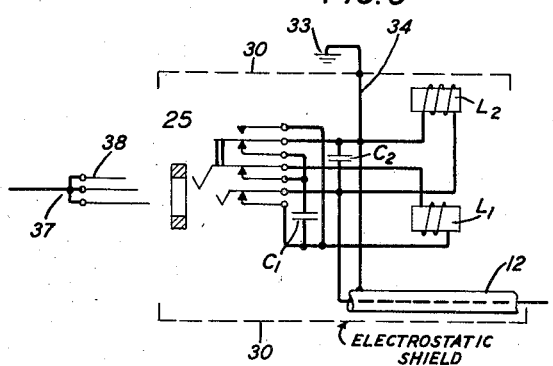
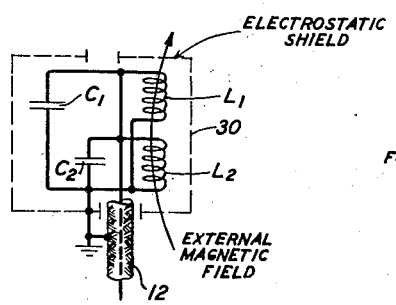
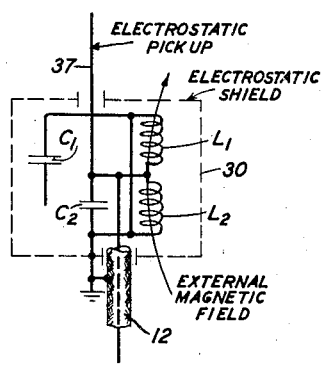
INVENTORS: J. B. HAYS
J. H. SHUHART
BY
G. H. Heydt
ATTORNEY Patented Jan. 4, 1944

2,338,245

UNITED STATES PATENT OFFICE 2,338,245

FAULT-LOCATING DEVICE

James B. Hays and John H. Shuhart, Summit, N. J., assignors to Bell Telephone Laboratories, Incorporated, New York, N. Y., a corporation of New York Application September 14, 1942, Serial No. 458,283

6 Claims. (Cl. 175—183)

This invention relates to testing systems and more particularly to a fault-locating means for exploring for faults in telephone wires and unsheathed cables.

The art of testing for and locating faults in electrical wires and cables by means of generating a voltage capable of producing a distinctive tone, applying this voltage to a wire or cable and exploring along the length of the cable with a suitable fault-locating means including an amplifier and indicator has been rather highly developed. However, difficulties have been experienced with the fault-locating devices of the prior art in that the amount of signal change when passing a fault in the wire or cable has at times been much less than that which is necessary to provide positive location of the faults. It has been discovered that much of the difficulty with the apparatus of the prior art has been due to the fact that the pick-up units employed were sensitive to both the electrostatic and electromagnetic components of the energy radiated from the faulty wire. It has also been discovered that when using an electromagnetic pick-up properly shielded against electrostatic pick-up, the ratio of the signal change when passing over ground faults is greatly increased. Also when using an electrostatic pick-up with the electromagnetic pick-up means rendered insensitive to electromagnetic radiations the ratio of the signal received from either side of an open fault is greatly increased.

It is therefore the object of this invention to provide a fault-locating device for exploring for faults in electric wires and cables in which either electrostatic or electromagnetic pick-up means may be employed independently and at will.

The foregoing object is attained by this invention which provides a fault-locating device for exploring for faults in electric wires and cables in which an electrostatically shielded electromagnetic pick-up is sensitive only to electromagnetic radiations, the combination also including an electrostatic pick-up which, when switched into the fault-locating device will render it insensitive to electromagnetic radiations and sensitive only to electrostatic radiations.

The invention may be better understood by referring to the drawing in which:

Fig. 1 is a cross section assembly view of a preferred form of the invention;

Fig. 2 is a cross section plan view of one end of the assembly shown in Fig. 1;

Fig. 3 is a schematic wiring diagram of the complete fault-locating device with both electromagnetic and electrostatic pick-ups arranged for independent operation;

Fig. 4 is a circuit diagram of the device connected for use as an electromagnetic pick-up most useful for locating grounds; and Fig. 5 is a schematic circuit of the device connected for use as an electrostatic pick-up, most useful for locating opens.

Referring now more particularly to Fig. 1, reference numerals 1 and 2 refer to laminated cores of magnetic material upon which are mounted coils L1 and L2 which act as the electromagnetic pick-up coils. These cores 1, 2 are suitably mounted together by means of non-magnetic machine screws 3 and 4. Cooperating with screws 3 and 4 are nuts 5, 6, 7, 8, 9 and 10. Nut 5 is inside the linen lashing cord 11 used for securing the single conductor shielded cable 12 to the frame of the pick-up unit.

The assembly of cores 1 and 2 and their associated coils L1 and L2 is supported by a suitable supporting frame 13. Core 2 is electrically insulated on one side from supporting frame 13 by laminated insulation 16, while similar laminated insulation 17 is provided for core 1. Insulating bushings 14 and 15 are provided on the inner side of supporting frame 18 to insulate nuts 8, 9 and screw 4 and consequently laminated cores 1 and 2 from the supporting frame 18. In the final assembly nuts 5 and 6 are secured tightly against core 2 while nuts 6 and 9 and nuts 7 and 10 cooperate to securely position laminated core 1 therebetween.

Supporting frame 18 is secured to an end plate 22 of suitable insulating material as for example phenol fiber. For this purpose, two flat head machine screws 23, 24 are provided which also are used for securing a telephone jack 25 to the supporting frame 18. Although not necessarily so, it is preferable that the end plate 22 be made circular in shape in order to simplify construction.

An insulating cylindrical tube 26 encloses the sides of the fault-locating device and is assembled to the end plate 22 by sliding it down on a shoulder 27 adapted for the purpose. A cover 21 also of insulating material is provided for the other end of the assembly and is also fitted to the cylindrical cover 26 by means of a suitable shoulder 28.

Just inside cylindrical insulating cover 26 there is located a helical electrostatic shield 30 which is wound on a suitable cylindrical support of insulating material 29. The electrostatic shield 30, while not shown in Fig. 1 to extend throughout the length of the device, actually extends throughout the entire length of its supporting tube 29.

The fault-locator assembly as shown in Fig. 1 is adapted to be carried by hand and therefore a suitable alternating current ground is provided by a contact strip 33 riveted to the outer surface of the cylindrical enclosure 26 by means of a series of rivets 35. The ground connection for the apparatus within the assembly is provided by a stranded conductor 34 soldered to one of the rivets 35 as shown in Fig. 1. The other end of this grounding conductor 34 is soldered to one of the terminals of the telephone jack 25. In order to isolate supporting frame 18 and consequently the sleeve of jack 25 from ground, a length of spaghetti tubing 36 is placed over the stranded grounding conductor 34.

Most of the internal electrical connections have been deleted from Fig. 1 for the sake of clarity. However, both the shield and the conductor of shielded cable 12 are connected to the proper terminal lugs of jack 25. Also the terminals of condensers C1 and C2 are connected to appropriate terminal lugs of telephone jack 25. All of the electrical connections are shown schematically in Fig. 3 to be hereinafter described.

Fig. 2 shows more clearly how cover 21 is secured to the completed assembly. A bar of insulating material 13 contains a hole at its center through which screw 3 passes. Two more threaded holes adapted to receive machine screws 19 and 20 are threaded near its ends as shown in Fig. 2. Two holes are provided in cover 21 for screws 19 and 20 and upon tightening these two screws cover 21 is securely attached to end plate 22 through laminated cores 1, 2 and supporting frame 18. It will thus be clearly seen how cover 21 and end plate 22 are securely assembled with cylindrical cover 26.

Fig. 2 shows L-shaped sections 1' and 2' for cores 1 and 2, respectively. It is obviously unnecessary that these cores have this shape. The L shape was used only because they were easily available as standard parts of standard apparatus. Fig. 2 also shows more clearly how shielded cable 12 is brought in the enclosure and around pick-up coils L1 and L2.

A hollow cylindrical metallic rod 37 of suitable length is provided as an electrostatic pick-up. This is electrically and mechanically secured to a plug member 38 made from solid conducting material and having the same shape and dimensions as the standard telephone plug for jack 25.

Referring now to Fig. 3 the various electrical connections are shown for the combined electrostatic and electromagnetic pick-up device of this invention. Plug member 38 is shown withdrawn from the assembly as for locating grounds with the electromagnetic pick-up units L1 and L2. Plug unit 38 as previously stated is actually made of solid material and is shown schematically in Fig. 3 as having its tip, ring and sleeve connections all joined together and electrically connected to electrostatic pick-up rod 37. With plug 38 withdrawn the connections provided by jack 25 are such as to connect the two coils L1 and L2 in parallel-aiding relationship. With the two coils thus connected a changing external magnetic field will generate a voltage which will appear at their terminals. It will also be noted that in this position condensers C1 and C2 are connected in parallel and across the terminals of the two parallel connected coils L1 and L2. These condensers act to tune the parallel-connected coils to the frequency of the tone source connected to the cable or wire under test. While tuning provides greater sensitivity, it is not essential in every case for under limited conditions where substantially no spurious energy is received, tuning can be eliminated. This figure also shows schematically how electrostatic shield 30 precludes any electrostatic pick-up by the elements enclosed therein.

Fig. 4 shows schematically the connections provided by the fault-locator assembly when the plug 38 is withdrawn as shown in Fig. 3. In this figure the external magnetic field is shown schematically passing through the two pick-up coils L1 and L2 and since they are connected parallel-aiding the parallel-connected terminals of these coils will have a voltage generated thereacross which will be applied to the shield and conductor of shielded cable 12. The other end of shielded cable 12 may be connected to any suitable amplifier and indicating device, not shown.

It has been found from experiments that the electromagnetic pick-up unit as shown schematically in Fig. 4 works most advantageously when locating grounds in grounded wires or cables and that the signal ratio as the fault is passed is greatly increased by having this pick-up unit electrostatically shielded to prevent electrostatic pick-up.

Fig. 5 shows the connections of the fault-locating device when plug 38 is inserted in jack 25. Tracing the circuit of Fig. 3 with plug 38 inserted in jack 25, it will be noted that the connections will be as shown in Fig. 5. In this case coils L1 and L2 are connected in parallel-opposing relationship so that there will be no voltage appearing across their parallel-connected terminals due to a changing external magnetic field. However, the electrostatic pick-up rod 37 extends beyond the electrostatic shield 30. This pick-up is connected to the conductor of shielded cable 12. Since coils L1 and L2 when connected in parallel-opposing relationship will have a different inductance only condenser C2 is connected thereacross in order to tune the coil to the frequency of the tone source. In selecting these condensers the inductance of coils L1 and L2 is determined for both the parallel-aiding and the parallel-opposing connections. The condenser C2 is then selected of such size as to tune the coils in parallel-opposing relationship to the frequency of the tone source. Condenser C1 is then selected of such magnitude that when added to the capacity of condenser C2 they will tune the two coils to the same frequency when connected in parallel-aiding relationship as shown in Fig. 4.

The connections for the electrostatic pick-up as shown schematically in Fig. 5 render the pick-up device substantially insensitive to all electromagnetically radiated energy and is of particular value for locating opens in wires or cables by the well-known exploring method.

It is emphasized that due to the peculiar arrangement of the apparatus as provided for this invention that either electrostatic or electromagnetic pick-up may be provided exclusive of the other and that the invention provides very light construction with a minimum amount of apparatus necessary for both types of operation. It has been found that this invention provides sufficient sensitivity to enable the location of grounds and opens several feet from the defective conductor.

What is claimed is:

1. A fault-locating device for exploring for faults in electric wires comprising in combination an electromagnetic pick-up coil system, an electrostatic shield therefor to render said coil system substantially insensitive to electrostatically radiated energy, a pair of output conductors for said coil system, an electrostatic pick-up means external to said shield, a connector for connecting said electrostatic pick-up means to said output conductors, and a switching means for changing the connections of said electromagnetic pick-up coil system to render it substantially insensitive to electromagnetically radiated energy whereby the fault-locating device is converted from an electromagnetic pick-up device to an electrostatic pick-up device.

2. A fault-locating device for exploring for faults in electric wires comprising in combination an electromagnetic pick-up coil system, an electrostatic shield therefor to render said coil system substantially insensitive to electrostatically radiated energy, a pair of output conductors for said coil system, an electrostatic pick-up means external to said shield including a plug, a connector comprising a jack adapted to receive said plug for connecting said electrostatic pick-up means to said output conductors, and a switching means included with said jack for changing the connections of said electromagnetic pick-up coil system to render it substantially insensitive to electromagnetically radiated energy whereby the fault-locating device is converted from an electromagnetic pick-up device to an electrostatic pick-up device.

3. A fault-locating device for exploring for faults in electric wires comprising in combination an electromagnetic pick-up coil system, a capacitor for tuning the coil system, an electrostatic shield therefor to render said tuned coil system substantially insensitive to electrostatically radiated energy, a pair of output conductors for said tuned coil system, an electrostatic pick-up means external to said shield, a connector for connecting said electrostatic pick-up means to said output conductors, a second tuning capacitor, and a switching means for changing the connections of said electromagnetic pick-up coil system to render it substantially insensitive to electromagnetically radiated energy and to connect said second tuing capacitor to said reconnected coil system whereby the fault-locating device is converted from a tuned electromagnetic pick-up device to a tuned electrostatic pick-up device.

4. A fault-locating device for exploring for faults in electric wires comprising in combination an electromagnetic pick-up coil system, a capacitor for tuning the coil system, an electrostatic shield therefor to render said tuned coil system substantially insensitive to electrostatically radiated energy, a pair of output conductors for said tuned coil system, an electrostatic pick-up means external to said shield including a plug, a connector comprising a jack adapted to receive said plug for connecting said electrostatic pick-up means to said output conductors, a second tuning capacitor, and a switching means included with said jack for changing the connections of said electromagnetic pick-up coil system to render it substantially insensitive to electromagnetically radiated energy and to connect said second tuning capacitor to said reconnected coil system whereby the fault-locating device is converted from a tuned electromagnetic pick-up device to a tuned electrostatic pick-up device.

5. A fault-locating device for exploring for faults in electric wires comprising in combination an electromagnetic pick-up coil system having a plurality of individual coils, connections for connecting said coils in parallel-aiding relationship, a capacitor means for tuning the coil system, an electrostatic shield surrounding said tuned coil system to render it substantially insensitive to electrostatically radiated energy, a pair of output conductors for the tuned coil system, an electrostatic pick-up means external to said shield, a connector for connecting said electrostatic pick-up means to the output conductors, and a switch for changing the connections of said electromagnetic pick-up coil system from parallel-aiding to parallel-opposing relationship to render it substantially insensitive to electromagnetically radiated energy, said switch also for changing the connections of the capacitor means to retune the reconnected coil system whereby the fault-locating device is converted from a tuned electromagnetic pick-up device to a tuned electrostatic pick-up device.

6. A fault-locating device for exploring for faults in electric wires comprising in combination an electromagnetic pick-up coil system having a plurality of individual coils, connections for connecting said coils in parallel-aiding relationship, a capacitor means for tuning the coil system, an electrostatic shield surrounding said tuned coil system to render it substantially insensitive to electrostatically radiated energy, a pair of output conductors for the tuned coil system, an electrostatic pick-up means external to said shield including a plug, a connector comprising a jack adapted to receive said plug for connecting said electrostatic pick-up means to the output conductors, and a switch included with said jack for changing the connections of said electromagnetic pick-up coil system from parallel-aiding to parallel-opposing relationship to render it substantially insensitive to electromagnetically radiated energy, said switch also for changing the connections of the capacitor means to retune the reconnected coil system whereby the fault-locating device is converted from a tuned electromagnetic pick-up device to a tuned electrostatic pick-up device.

JAMES B. HAYS.
JOHN H. SHUHART.